April 4, 1939.  W. E. MYERS ET AL  2,153,003
CHAIN FASTENER
Filed Sept. 30, 1936
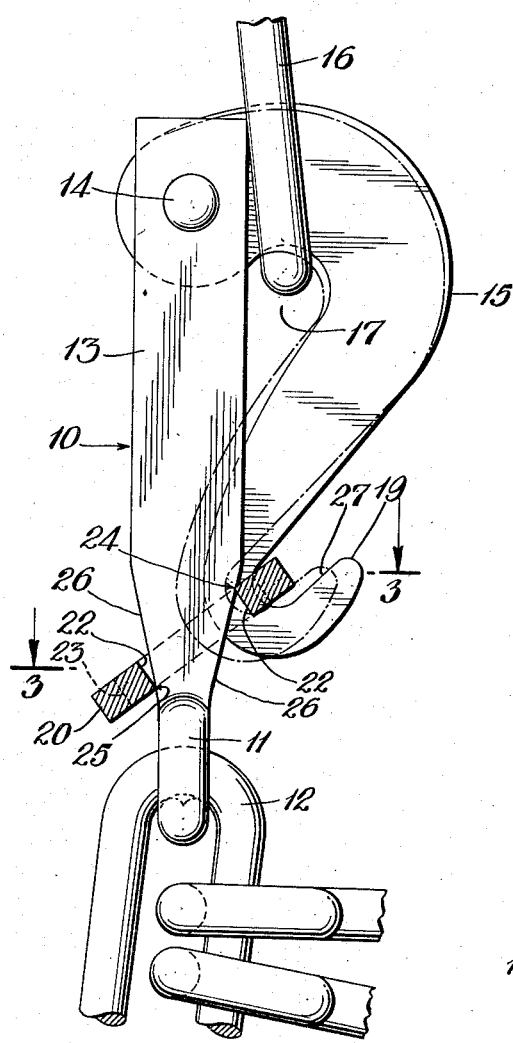
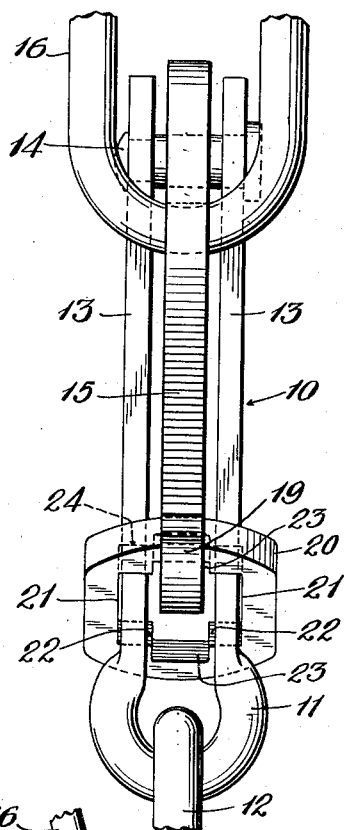
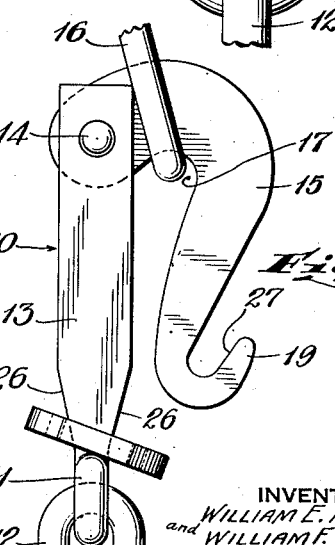
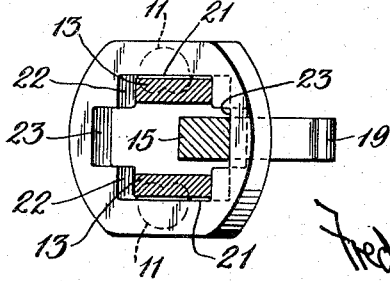
INVENTORS
WILLIAM E. MYERS
and WILLIAM F. SCHWARTZ
BY Frederick P. Duncan, ATTORNEY Patented Apr. 4, 1939

2,153,003

UNITED STATES PATENT OFFICE 2,153,003

CHAIN FASTENER

William E. Myers, York, and William F. Schwartz, Springgarden Township, York County, Pa., assignors to American Chain & Cable Company, Inc., a corporation of New York Application September 30, 1936, Serial No. 103,270

17 Claims. (Cl. 24—69)

Our invention relates to chain fasteners and more particularly to fasteners of the type adapted to connect the opposite ends of the side chains of tire chain assemblies.

An object of the invention is to provide improved means for preventing accidental release of the chain fastener.

Our invention relates particularly to fasteners of the type comprising an elongated body, a latch lever pivoted at one end on the body and having a hook at its other end, and a keeper slidable on the body and adapted to hold the hook end of the lever in latching position.

A more specific object of the invention is to so arrange the parts that the keeper will jam or bind in holding position and thus be prevented from accidentally working clear of the latch lever.

These and other objects will appear in the following description of a preferred embodiment of our invention and thereafter the novelty and scope of the invention will be pointed out in the claims.

In the accompanying drawing:

Figure 1 is a view in side elevation of our improved chain fastener in latched position with the keeper shown in section;

Fig. 2 is an edge view of the same looking from the right hand side of Fig. 1;

Fig. 3 is a view in section taken substantially on the line 3—3 of Fig. 1; and

Fig. 4 is a view similar to Fig. 1 showing the fastener unlatched.

The particular embodiment shown in the drawing comprises a body 10 formed of sheet metal or flat stock bent to the shape of a hairpin loop. At the closed end of the loop the stock is pressed in a dye to give it a round cross-section and also to form an eye 11 in which an end link 12 of a side chain may be hooked. At their free ends the legs 13 of the hairpin loop are tied together by means of a rivet 14 and, pivoted on this rivet, between the legs of the hairpin loop, is a latch lever 15.

The latch lever which is of elbow-shape is adapted to be hooked through a link 16 at the opposite end of the side chain and then be swung on its pivot back toward the eye 11 to draw the ends of the side chain together. The shape of the lever is such as to provide a recess 17 between the lever and the body to receive the link 16, this recess being deep enough to permit the free end of the latch lever to be passed between the legs 13 while the lever is hooked through the link 16. The latch lever is formed at its free end with a hook 19 which is turned outwardly and is adapted to engage a keeper 20 slidable on the legs 13.

The keeper is preferably stamped out of sheet metal and has a rectangular aperture therein. This aperture is wide enough to provide ample clearance between its side walls 21 and the outer faces of the legs 13. Each end wall of the aperture comprises a pair of shoulders 22 separated by a recess 23. Ample clearance is provided between the opposite pairs of shoulders and the edges of the legs 13 as long as the keeper lies in a plane normal to the longitudinal axis of the body, but if the keeper is tilted out of normal the upper corners 24 at the upper end of the keeper will bite into the legs at one edge thereof and the lower corners 25 at the lower end of the link will bite into the legs at the opposite edge thereof. The legs are tapered toward the eye 11, as indicated at 26, so as to provide a greater clearance between the shoulders and permit a sharper inclination of the keeper in the vicinity of the eye 11 and hence a greater binding effect.

The recesses 23 provide between them sufficient clearance for the hook 19 to pass through the keeper. Thus, in operation, after the latch lever has been hooked through a link 16, the hook 19 is swung in between the legs and the keeper which has been moved against the eye 11 to clear the end of the lever, as shown in Fig. 4, is now slid back over the hook and one end of the keeper is engaged in the bight of the hook. If now the fastener is suspended in the vertical position shown the opposite end of the keeper will drop by gravity and the diagonal opposed corners 24 and 25 of the opposed pairs of shoulders 22 will bite into the legs 13 and thereby resist any forces that may be exerted to slide the keeper upwardly on the body of the fastener. Of course, when the fastener is inverted the keeper may swing out of its gripping binding position and slide by gravity away from the eye, but in so doing it merely slides further along the lever and hence does not unlatch the lever. It is when the lever is in pendant position that there is the most danger of accidental unlatching and this is prevented in our fastener by designing the parts so that the keeper will jam in latched position.

It will be observed that with the parts in the position shown in Figs. 1 and 2 the keeper is spaced from the eye portion 11 which bulges out beyond the legs 13. Hence, the eye portion does not prevent the keeper from assuming the desired inclined clutching position. At the same time, the eye portion acts as a stop to prevent the keeper from slipping off the body when it is unhooked from the lever, as shown in Fig. 4.

In fasteners of this general character as heretofore constructed no thought has been given to the automatic jamming or locking of the keeper. Instead, the fasteners have been so designed that the keeper could not take up an inclined position with opposite shoulders in gripping engagement with the body when the latch lever was in depending position. The reason for this was that the apertured eye of the fastener supported the keeper when in its lowermost position at such a slight angular departure from normal to the longitudinal axis of the body that there was clearance between the shoulders. As a consequence, a slight tap on the hook was sufficient to pry the keeper up far enough to ride over the hook and then the keeper would drop clear of the hook. Joggling of the fastener would also cause the keeper to become unlatched in the same way and tire chains were not infrequently accidentally detached in service.

Such accidental unlatching is prevented in our device because the wedging action of the hook on the eye of the keeper merely increases the locking effect and jams the keeper all the tighter against any tendency to slide up the body of the fastener. It will be noted that as the latch lever swings inwardly to the position shown in broken lines in Fig. 1, the outer face 27 of the bight of the hook makes a substantially parallel contact with the face of the keeper so that the latter cannot swing clockwise about the corners 24 as a fulcrum to lift the lower end of the keeper and release the grip. On the contrary the tendency is for the keeper to swing counter-clockwise and increase the grip.

We have described our invention as applied to a specific form of fastener in which the parts are made largely of sheet metal. Obviously, our invention is not limited to such a construction and although a better locking effect can be obtained if sharp corners are provided on the shoulders 22, nevertheless, it is not absolutely necessary to provide such sharp corners. We have also described our device as applied to tire chain assemblies, but obviously it can also be employed to connect other elements as well. It will be understood, therefore, that the showing in the drawing is illustrative and not limitative of our invention and that we reserve the right to make various changes in form, construction and arrangement of parts without departing from the spirit and scope of our invention as pointed out in the claims.

We claim:

1. A device of the character described comprising a body in the form of an elongated loop with the side elements thereof integrally connected at one end by an eye extending laterally in the plane of the loop beyond the sides of the loop, a latch lever pivoted on the body between the side elements thereof at the other end of the loop, said lever having a hook at the free end thereof, and a keeper having an aperture receiving the body with a loose sliding fit, the keeper aperture being of less width than the eye portion and being defined by end walls of slightly greater spacing than the depth of the side elements, the side elements being of reduced depth adjacent said eye portion and the eye portion being spaced beyond the hook to such extent that the keeper may assume by gravity an inclined binding position when the body is in upright position with the lever pivot uppermost and with one end of the keeper engaged in the bight of the hook.

2. A device of the character described comprising a body in the form of an elongated loop, a latch lever pivoted on the body between the side elements thereof at one end of the loop, said lever having a hook at the free end thereof, a keeper having an aperture receiving the body with a loose sliding fit, the keeper aperture being defined by end walls of slightly greater spacing than the depth of the side elements, and a stop for the keeper projecting from the body at a point remote from the pivoted end of said lever, said side elements being of reduced depth adjacent said stop and said stop being spaced beyond the hook to such extent that the keeper may assume by gravity an inclined binding position when the body is in upright position with the lever pivot uppermost and with one end of the keeper engaged in the bight of the hook.

3. A device of the character described comprising a body in the form of an elongated loop with the side elements thereof integrally connected at one end by an eye extending laterally in the plane of the loop beyond the sides of the loop, a latch lever pivoted on the body between the side elements thereof at the other end of the loop, said lever being provided with an outwardly directed hook at the free end thereof, and a keeper having an aperture receiving the body with a loose sliding fit, the keeper aperture being of less width than the eye portion and being defined by end walls of slightly greater spacing than the depth of the side elements, said side elements being of reduced depth adjacent the eye portion and the eye portion being spaced beyond the hook to such extent that the keeper may assume by gravity an inclined binding position when the body is in upright position with the lever pivot uppermost and with one end of the keeper engaged in the bight of the hook, the outer face of the bight of the hook being substantially parallel to the face of the keeper when the keeper is in such binding position.

4. A device of the character described comprising a body in the form of an elongated loop having flat side elements disposed with their flat faces parallel and integrally connected at one end by an eye portion of round cross section extending laterally in the plane of the loop beyond the flat side elements, a rivet connecting the side elements at the other end of the loop, a latch lever pivoted between the side elements on said rivet, said lever having an outwardly directed hook at the free end thereof, and a keeper having an aperture receiving the side elements with a free sliding fit, the keeper aperture being of less width than said eye portion and being defined by end walls of greater spacing than the depth of said side elements, the eye portion being spaced beyond the hook to such extent that the keeper may assume by gravity an inclined binding position when the body is in upright position with the lever pivot uppermost and with one end of the keeper engaged in the bight of the hook, said side elements being tapered to a narrower depth adjacent the eye portion so as to permit a sharp inclination of the keeper when in said binding position.

5. A fastener comprising a base member, a lever pivotally mounted on said base member for movement into substantial parallelism with said base member, a keeper freely slidable on said base member over the free end of said lever and rotatable on said base member about an axis parallel to the pivot of said lever into frictional contact with said base member, and means on the lever bearing on said keeper to hold the keeper in rotated position and to exert a pressure on said keeper to increase such frictional contact as the lever tends to move to disengage from the keeper.

6. A fastener comprising a base member, a lever pivotally mounted on said base member for movement into substantial parallelism with said base member, a keeper freely slidable on said base member over the free end of said lever and rotatable on said base member about an axis parallel to the pivot of said lever into frictional contact with said base member, and means on the lever and keeper exerting a rotative force on said keeper in the same direction as the lever tends to move in a direction to disengage from said keeper.

7. A fastener comprising a base member, a lever pivotally mounted on said base member for movement into substantial parallelism with said base member, a keeper freely slidable on said base member over the free end of said lever and rotatable on said base member about an axis parallel to the pivot of said lever into frictional contact with said base member, and wedging means on the lever and keeper cooperating when the keeper is in rotated position, to exert a force on said keeper to increase its frictional contact with the base member as the lever tends to move in a direction to disengage from said keeper.

8. A fastener comprising a base member, a lever pivotally mounted on said base member for movement into substantial parallelism with said base member, a keeper freely slidable on said base member over the free end of said lever and rotatable on said base member into frictional contact with said base member, and means on the lever bearing on said keeper to hold the keeper in rotated position and to exert a pressure on said keeper to increase such frictional contact as the lever tends to move to disengage from the keeper.

9. A fastener comprising an elongated base member, a lever pivoted near one end thereof for movement into substantial parallelism with said base member, a keeper surrounding said base member and freely slidable thereon into and out of engagement with the end of the lever, opposed biting edges on said keeper facing said base member adapted when said keeper is tilted to engage opposite faces of said base member, and cooperating means on said lever and keeper operating as the lever tends to move in a direction to disengage from said keeper to cause said edges to bite said faces of said base member.

10. A fastener comprising an elongated base member, a lever pivoted near one end thereof for movement into substantial parallelism with said base member, a keeper surrounding said base member and freely slidable thereon into and out of engagement with the end of the lever, opposed biting edges on said keeper facing said base member adapted when said keeper is tilted to engage opposite faces of said base member, and cooperating means on said lever and keeper operating as the lever tends to move in a direction to disengage from said keeper to cause said edges to bite the faces of said base member, one of said faces of the base member engaged by a biting edge of said keeper being inclined in a direction to increase biting engagement of said biting edge.

11. A fastener comprising an elongated base member, a lever pivoted near one end thereof for movement into substantial parallelism with said base member, a keeper surrounding said base member and freely slidable thereon into and out of engagement with the end of the lever, opposed biting edges on said keeper facing said base member adapted when said keeper is tilted to engage opposite faces of said base member, and cooperating means on said lever and keeper operating as the lever tends to move in a direction to disengage from said keeper to cause said edges to bite said faces of said base member, one of said faces of said base member being inclined in a direction to provide for such tilting movement of said keeper.

12. A fastener comprising an elongated base member, a lever pivoted thereto for movement into substantial parallelism with said base member, a keeper surrounding said base member and freely slidable into and out of engagement with the end of said lever, biting edges and cooperating faces on said keeper and base member adapted when said keeper is tilted to engage, and cooperating means on said lever and keeper operating as said lever tends to move in a direction to disengage from said keeper to cause said edges to bite said faces.

13. A fastener comprising a base member including parallel side members having provision at one end for connection with a link and at the other end for pivotally supporting a lever for movement of its free end into the space between said side members, a lever pivotally supported at said other end of said side members, a keeper slidably mounted on said side members and having an aperture to receive said lever and said side members, the sections of the walls of the aperture opposite the upper and lower faces of the side members being spaced a greater distance than the depth of the side members to permit the keeper to tilt to engage said sections with said faces, and a hook on the end of said lever having the inner surface of its end beyond the bight bearing and pressing on the upper end of said keeper when said keeper is in said tilted position in the bight of said hook and when said lever tends to move in a direction to disengage from said keeper.

14. A fastener comprising a base member including parallel side members having provision at one end for connection with a link and at the other end for pivotally supporting a lever for movement of its free end into the space between said side members, a lever pivotally supported at said other end of said side members, a keeper slidably mounted on said side members and having an aperture to receive said lever and said side members, the sections of the walls of the aperture opposite the upper and lower faces of the side members being spaced a greater distance than the depth of the side members to permit the keeper to tilt to engage said sections with said faces, and a hook on the end of said lever having the inner surface of its end beyond the bight extending substantially parallel to said keeper when said keeper is in said tilted position.

15. A fastener including an elongated base, a securing lever pivoted on said base, a hook on the rear face of the free end of said lever inclined toward the pivot of said lever, and a keeper loosely surrounding said base and engaging said hook, said keeper being disengageable from said hook by movement of the keeper toward the pivot of said lever and said keeper being rotatable on said hook by gravity into jamming engagement with said base to lock the keeper against movement to disengage from said hook.

16. A fastener including an elongated base, a securing lever pivoted on said base, a hook on the rear face of the free end of said lever inclined toward the pivot of said lever, a keeper loosely surrounding said base and engaging said hook, said keeper being disengageable from said hook by movement of the keeper toward the pivot of said lever, said keeper being rotatable on said hook by gravity into jamming engagement with said base to lock the keeper against movement to disengage from said hook, and cooperating means on said hook and keeper tending to further rotate said keeper upon movement of said lever in a direction to disengage the hook from said keeper.

17. A fastener including an elongated base, a securing lever pivoted on said base, a hook on the rear face of the free end of said lever inclined toward the pivot of said lever, and a keeper loosely surrounding said base and engaging said hook, said keeper being movable toward the pivot of said lever by said hook upon movement of said lever in a direction to disengage the hook from the keeper, and said keeper being rotatable on said hook by gravity into jamming engagement with said base to prevent said lever from moving said keeper in a direction toward said pivot.

WILLIAM E. MYERS.
WILLIAM F. SCHWARTZ.